Figure 7:
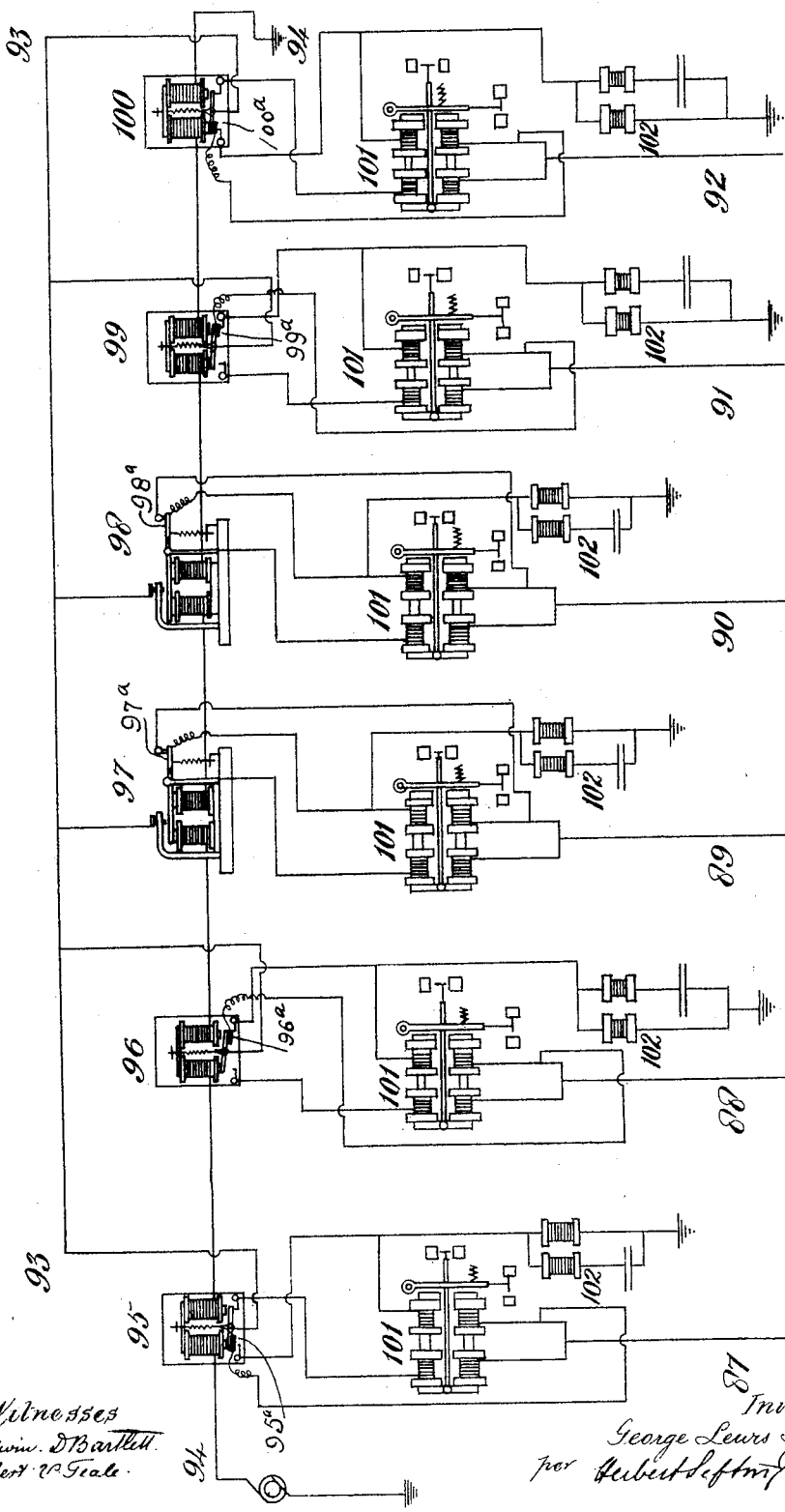

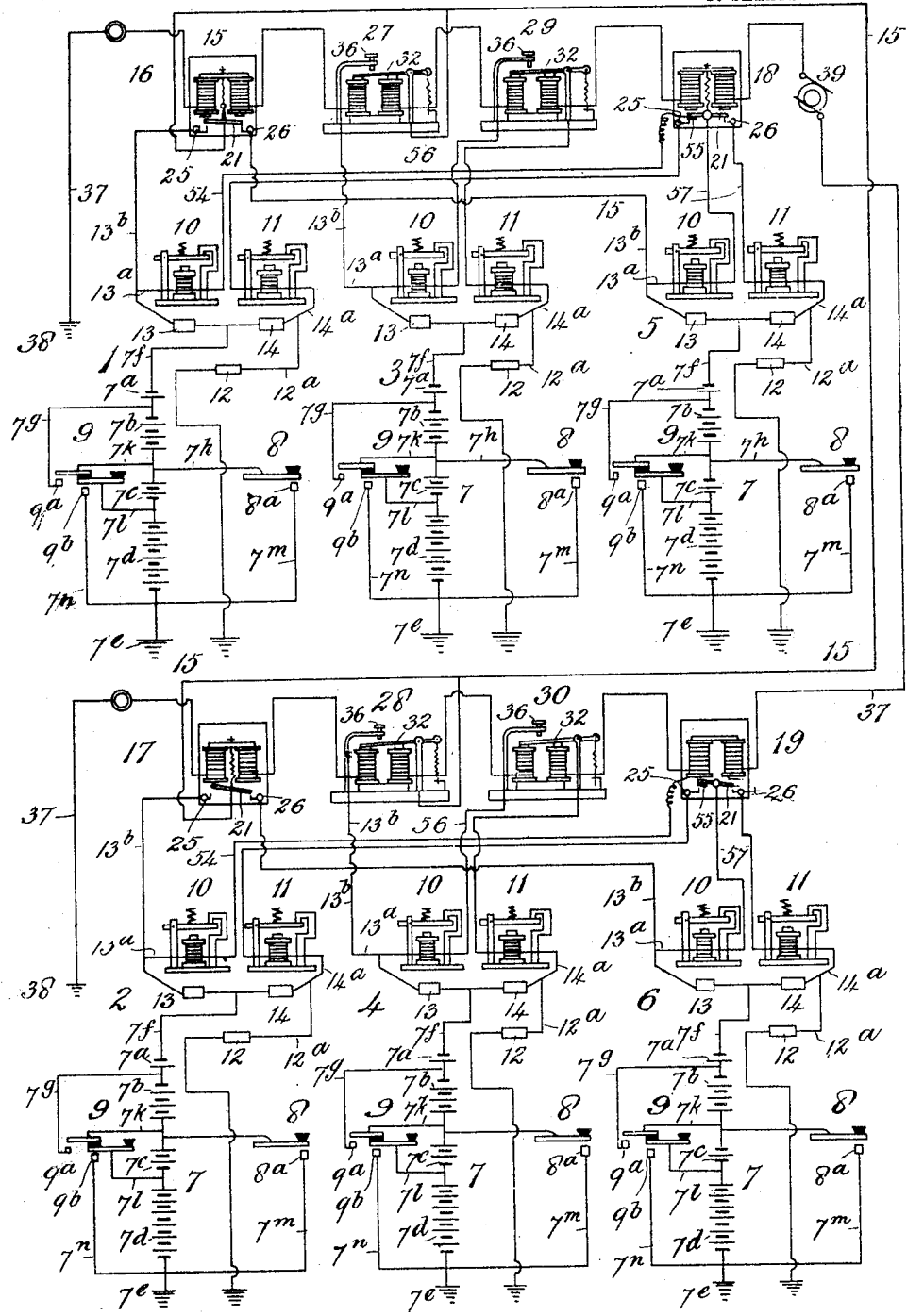

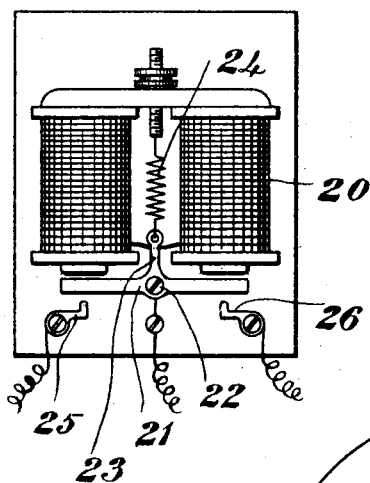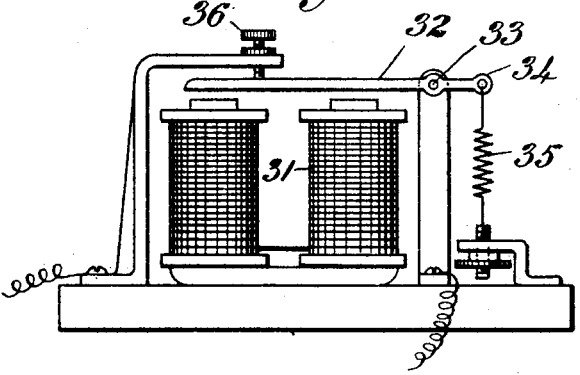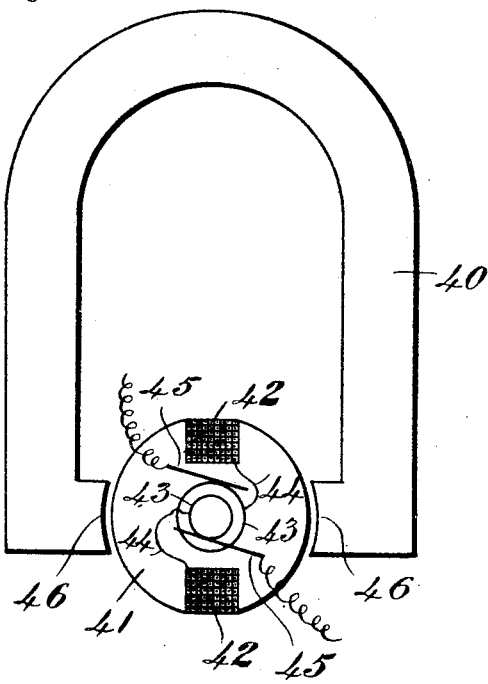

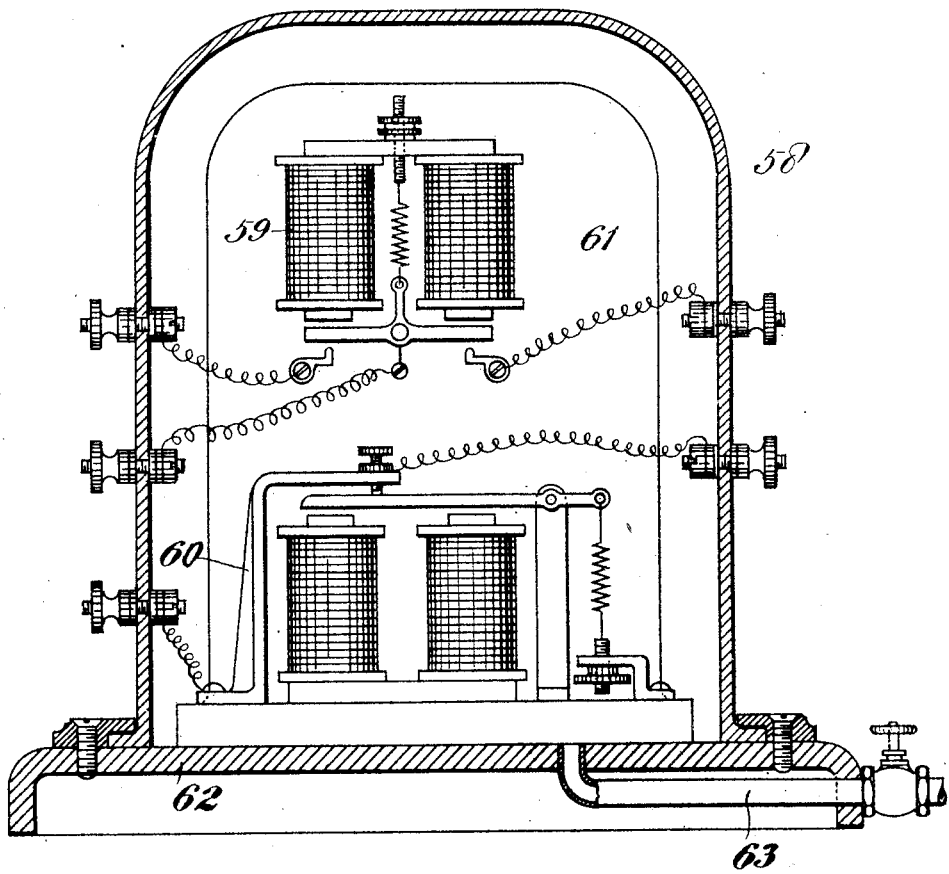
Fig:5.

No. 799,567.  
PATENTED SEPT. 12, 1905.  
G. L. HOGAN.  
MULTIPLEX TELEGRAPHY.  
APPLICATION FILED AUG. 11, 1902.

10 SHEETS—SHEET 4.

Fig. 6.

Witnesses  
Edwin D. Bartlett  
Albert V. Teale

Inventor  
George Lewis Hogan  
per Herbert Sefton Jones  
Attorney

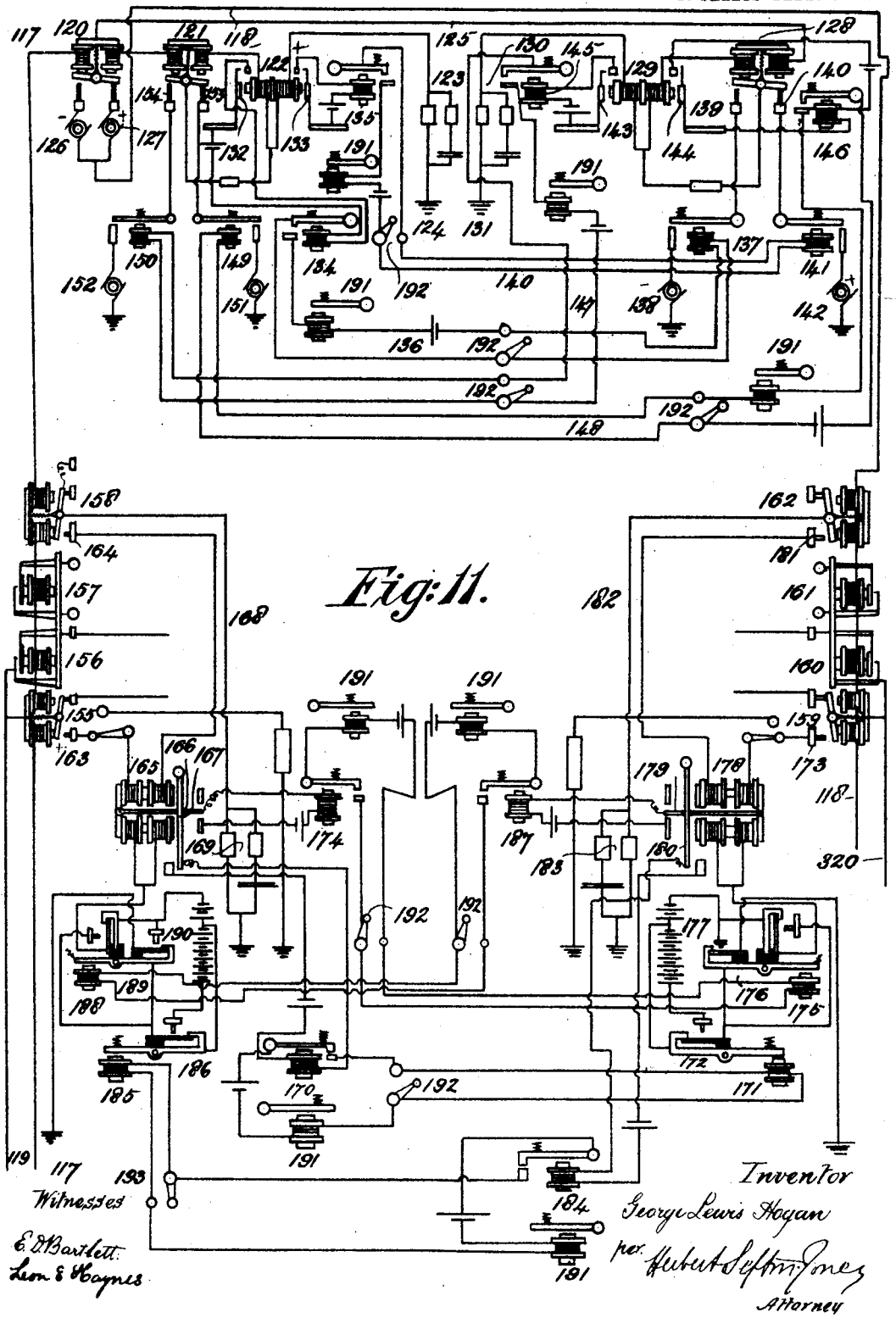

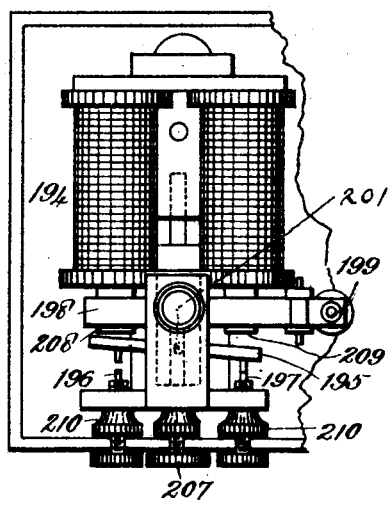
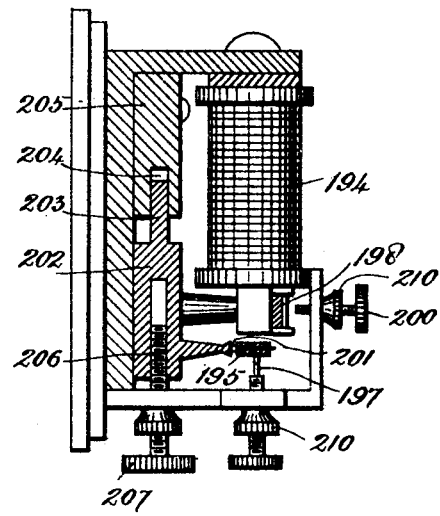
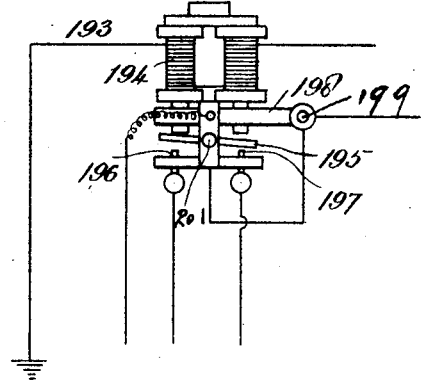
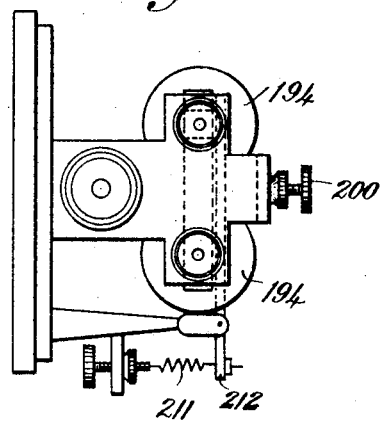

No. 799,567. PATENTED SEPT. 12, 1905.
G. L. HOGAN.
MULTIPLEX TELEGRAPHY.
APPLICATION FILED AUG. 11, 1902.

10 SHEETS—SHEET 10.

Witnesses
Edwin D. Bartlett
Albert V. Yeale

Inventor
George Lewis Hogan
per H. Sefton Jones
Attorney

UNITED STATES PATENT OFFICE.

GEORGE LEWIS HOGAN, OF LONDON, ENGLAND.

MULTIPLEX TELEGRAPHY.

No. 799,567.          Specification of Letters Patent.          Patented Sept. 12, 1905.

Application filed August 11, 1902. Serial No. 119,317.

*To all whom it may concern:*

Be it known that I, GEORGE LEWIS HOGAN, a citizen of the United States of America, residing at the Hotel Cecil, Strand, London, England, have invented a new and useful Improvement in Multiplex Telegraphy, of which the following is a specification.

This invention relates to the transmission of telegraphic messages, and is especially directed toward improving multiplex systems in which a given transmission or signaling line or medium is arranged between a plurality of sets of transmitting and receiving instruments at one end of the line and a plurality of corresponding sets at the other end of the line, each set at one end of the line being arranged, when connected with the corresponding set at the other end of the line, to form a complete system for the transmission of electric impulses, means being provided for repeatedly intermittently connecting in rapid succession the transmission-line with and disconnecting the same from a plurality of the sets at one end of the line and a plurality of the sets at the other end, said means consisting of electromagnetic mechanism actuated by a synchronizing fluctuating electric current or currents, whereby the connections at the two ends of the line are effected synchronously.

One feature of the present invention consists in placing the transmission line or wire in consecutive or repeated electrical connection with three contacts, instruments, or systems at one station and three corresponding ones at another station by means of a synchronizing-current consisting of a series of alternately positive and negative electric impulses separated by zero periods, the positive impulses effecting one contact, the zero period another contact, and the negative impulses the third.

Another feature of this invention consists in the provision of means for rendering the receiving instruments at the sending-station inoperative during the interval of time during which the sending-station is disconnected from the transmission-line.

Another feature of this invention consists in employing the synchronizing line or medium also as a signaling line or medium, the signaling being effected by adding increments to the synchronizing electric impulses.

Another feature of the present invention consists in the combination, with the multiplex system mentioned above, of means for repeating the various currents and impulses. For instance, when a signaling-circuit and a combined synchronizing and signaling circuit are employed means may be provided for repeating the signaling-currents of the signaling-circuit onto another signaling-circuit and for repeating the synchronizing-currents and its signaling increments onto another combined sychronizing and signaling circuit.

Other features and combinations are hereinafter pointed out as being essentially part of the invention.

In order that this invention may be clearly understood, various embodiments of the same are by way of example illustrated in the accompanying drawings and hereinafter described with reference thereto.

Figure 8:
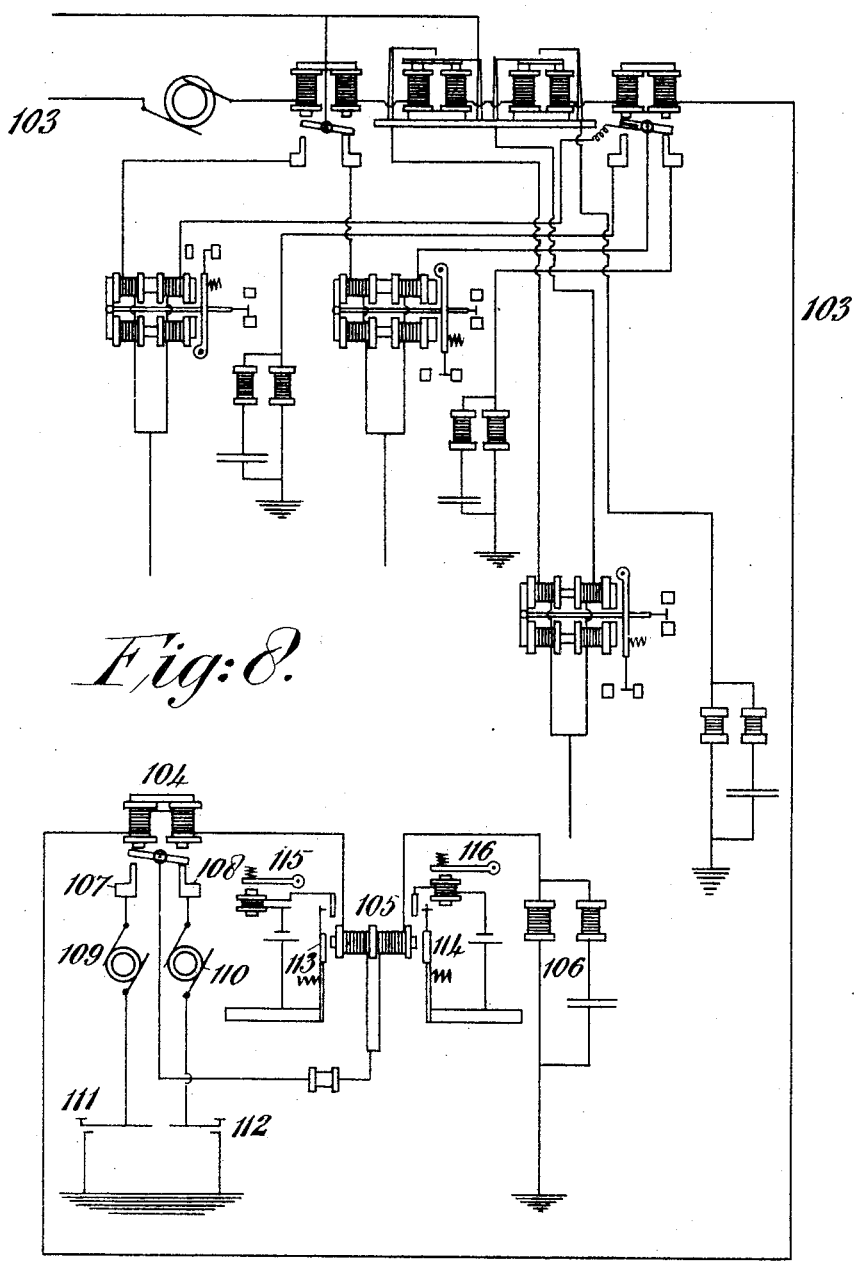
Figure 9:
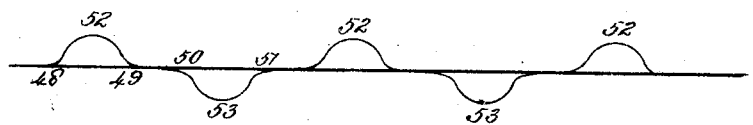
Figure 10:
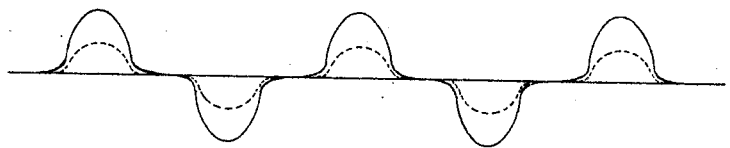
Figure 16:
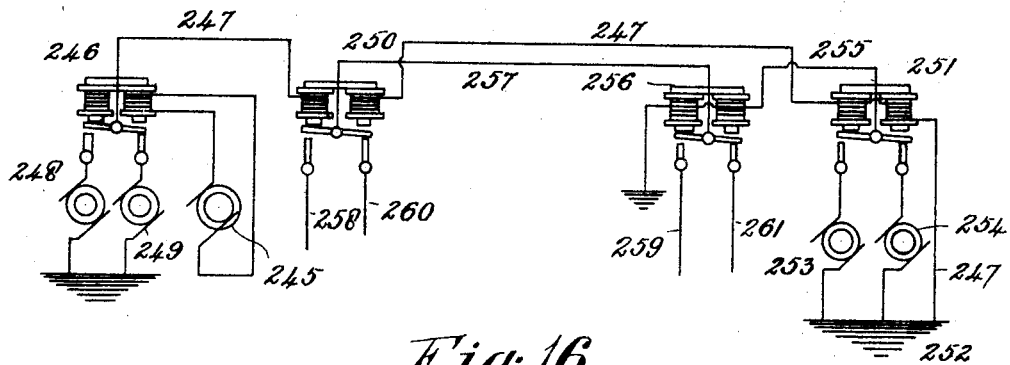

In said drawings, Figure 1 illustrates diagrammatically an arrangement of the telegraphic apparatus and circuits in the application of this invention to three quadruplex systems of the bridge type. Fig. 2 is a front elevation of a two-way distributer, hereinafter described. Fig. 3 is a front elevation of a distributer adapted to effect the connections corresponding to the zero periods of the synchronizing-current. Fig. 4 is a diagrammatic representation of a generator for producing alternate positive and negative electric impulses separated by zero periods. Fig. 5 illustrates a distributer inclosed in an air-tight case containing gases under a pressure greater than normal atmospheric pressure. Fig. 6 illustrates diagrammatically an arrangement of the telegraphic apparatus and circuits at one end of a transmission-line in the application of this invention to three quadruplex systems of the differential type. Fig. 7 illustrates a system by which six differential quadruplex stations which are widely separated can simultaneously communicate with each other in pairs by means of one transmission-line. Fig. 8 illustrates one end of a system in which the synchronizing-line of a triple differential quadruplex system is also utilized as a signaling-line. Fig. 9 indicates graphically the nature of the synchronizing-current generated by the generator shown in Fig. 4. Fig. 10 indicates graphically the nature of the current in the synchronizing-circuit when increments are added to the ordinary synchronizing impulses for signaling purposes. Fig. 11 diagrammatically illustrates means for repeating the signaling-currents passing along one way of a three-way or triple quadruplex system and also means for reperting the synchronizing impulses and the signaling increments of the synchronizing impulses. Fig. 12 is a front elevation of a three-way distributer having a polarized armature and a non-polarized armature. Fig. 13 is a part-sectional side elevation of the same. Fig. 14 is a plan of the same. Fig. 15 illustrates diagrammatically the method of connecting up said three-way distributer. Fig. 16 diagrammatically shows means for generating the synchronizing impulses from two direct-current generators and means for repeating the synchronizing impulses.

Referring to Fig. 1, the instruments and connections 1 are adapted to form, when connected with the instruments and connections 2, a single quadruplex telegraph system of the bridge type, and similarly quadruplex sets 3 and 4, when connected together, are adapted to form a quadruplex system, and similarly the sets 5 and 6 are adapted, when interconnected, to form a quadruplex system. These six quadruplex sets of the bridge type may be arranged as shown or in any other suitable manner. In each of these sets 7 is the battery, 8 the reversing-key, 9 the increment-key, 10 a polarized sounder, 11 a non-polarized sounder, 12 the artificial line, and 13 14 balancing resistances. The instruments 10 and 11 may be considered as polarized and non-polarized relays for operating their respective sounders, the arrangement usually used in ordinary practice. The batteries 7 are split up in the well-known manner into parts $7^a$ $7^b$ $7^c$ $7^d$ all in series on the line $7^f$, which is earthed at $7^e$ and is connected at its other end in parallel to the balancing resistances 13 14. The parts $7^a$ and $7^b$ are respectively single-cell and three-cell batteries adapted to send negative current through the line, while the parts $7^c$ and $7^d$ are two-cell and six-cell batteries adapted to send positive current through the line. Between $7^a$ and $7^b$ is connected a wire $7^g$, leading to terminal $9^a$ of the increment-key. Between $7^b$ and $7^c$ are connected two wires, one, $7^h$, leading to the reversing-key 8 and the other, $7^k$, leading to the increment-key 9. Between $7^c$ and $7^d$ is connected a wire $7^l$, leading to the key 9, and between $7^d$ and earth are connected two wires $7^m$ and $7^n$, leading, respectively, to terminals $8^a$ of the reversing-key 8 and $9^b$ of the increment-key 9. The artificial line 12 lies in a wire $12^a$, connected at one end to the wire $14^a$, between the balancing resistance 14 and the non-polarized sounder 11 and earthed at the other end. The balancing resistance 13 is connected to the polarized sounder 10 by wire $13^a$ and is also connected in parallel by a wire $13^b$ to the contact-terminal 25, as and for the objects more fully described below. The manner of working a quadruplex set of this character is very well known to telegraph-engineers. The arrangement was, it is believed, first described in British Patent of Thomas A. Edison, No. 384 of 1875. It is therefore needless to further describe it here. The arrangement is also described with some differences in United States Patent No. 209,241 of 1878, T. A. Edison. The distributers or circuit-closers 16 17 18 19 27 28 29 30 are adapted to connect the transmission-line 15 15 repeatedly and consecutively between and to disconnect the same from the sets 1 2, 3 4, 5 6 in rapid succession and to render the receiving instruments 10 11 inoperative during the interval of time during which said receiving instruments are disconnected from the transmission or signalling line 15 15, and the frequency of the change of connections effected by the distributers is so high that the change of connections is not detrimental to the reading of signals.

Each of the distributers 16 17 18 19, as shown in Fig. 2, comprises an electromagnet 20, provided with an oscillatory polarized armature 21, pivoted on the pivot 22 and provided with a projection 23, to which the adjusting-spring 24 is connected. The armature, according to the direction of the current flowing through the coils of the electromagnet, makes contact with one or other of the stops 25 26. The spring 24 maintains the armature out of contact with both stops while no current is flowing.

Each of the distributers 27 28 29 30, as shown in Fig. 3, comprises an electromagnet 31, provided with a non-polarized armature 32, pivoted on the pivot 33 and having a tailpiece 34, to which the adjusting-spring 35 is connected. When either a positive or a negative current flows round the coils of the electromagnet, the armature is attracted to the electromagnet and the contact between the armature and the contact-stop 36 is broken. During the period in which no current flows through the coils of the electromagnet the armature on account of the tension of the spring 35 makes contact with the stop 36.

Referring once more to Fig. 1, it will be seen that all the magnetizing-coils of the distributers are arranged in series in the circuit 37 37, which is grounded at its two ends at 38 38. Said circuit, which is called the "synchronizing-circuit," contains the generator 39, which may conveniently be a magneto-generator. I prefer to employ a magneto-generator of the construction diagrammatically represented by Fig. 4, in which—

40 represents the permanent field-magnet, 41 the armature-core, 42 42 the armature-coils, 43 43 two collector-rings, 44 44 connections between the armature-coils and said collector-rings, 45 45 the two brushes. It will be observed that the width of the armature-core between the armature-coils is so great relatively to the breadth of the pole-pieces 46 46 that when the armature is in the position indicated in Fig. 4 a large proportion of the lines of force pass through all the winding of the armature-coils and that this remains the case while the armature turns through a considerable angle about the position shown in Fig. 4—that is to say, while the armature turns through a considerable angle in the neighborhood of the position shown in Fig. 4 the number of lines embraced by the armature-winding remains practically at a maximum, and consequently the zero period of the current generated by the armature-coils is considerable and in practice is conveniently made approximately equal to the periods in which the negative and positive currents are being generated.

Fig. 9 indicates graphically the nature of the synchronizing-current generated by a generator such as that shown in Fig. 4. In Fig. 10 lengths along the axis represent time and ordinates at right angles to the axis represent current strength. The period between 48 and 49 represents a period of positive current. The period between 49 and 50 represents a period during which the current generated is almost zero, hereinafter called the "zero" period, and the period between 50 and 51 the period of negative current. 52 52 may consequently represent a series of positive current impulses and 53 53 a series of negative current impulses.

Referring to Fig. 1, it will be seen that the armatures of the distributers 16 17 of the quadruplex sets 1 2, respectively, are directly connected with the two ends of the transmission-line 15 15, the stop 25 of the distributer 16 being connected with the quadruplex set 1 and the stop 25 of the distributer 17 being connected with the quadruplex set 2. The quadruplex sets 3 4 are respectively connected with the contact-stops 36 36 of the distributers 27 28, while the quadruplex sets 5 6 are respectively connected with the contact-stops 26 26 of the distributers 16 17. The bridge-wires 54 54 of the quadruplex sets 1 2 are broken and the two sides of the break are connected with the contact-stops 25 25 of the distributers 18 19 and with insulated contact-pieces 55 55, mounted upon the armatures of said distributers. The bridge-wires 56 56 of the sets 3 4 are similarly broken and the free ends of the break connected with the contact-stops 36 36 and the armatures 32 32 of the distributers 29 30. The bridge-wires 57 57 of the sets 5 6 are similarly broken and the free ends connected with the contact-stops 26 26 and the armatures of the distributers 18 19. The manner in which this triple quadruplex system (illustrated in Fig. 1) can be operated in such a manner that the twelve operators of the twelve keys can operate simultaneously with the corresponding operation of the corresponding receiving instruments will be understood from the following explanation: The positions of the various armatures of the distributers (shown in Fig. 1) may be supposed to be produced by a positive impulse flowing through the synchronizing-circuit 37 37. It will be noticed that both of the armatures of the distributers 16 17 are making contact with the contact-stops 26 26 and are consequently placing the quadruplex sets 5 6 in direct communication with each other through the transmission-line 15 15. It will also be observed that the armatures of the distributers 18 19 are also making contact with their corresponding contact-stops 26 26 and are consequently completing the bridge-wires 57 57 of the two sets. Consequently during the passage of a positive impulse the sets 5 6 form a complete quadruplex system which can be operated in the ordinary manner. During the passage of a positive impulse it will be observed that the sets 1, 2, 3, and 4 are entirely disconnected from the transmission-line. On the positive current ceasing to flow and during the zero period the armatures of the distributers 16 17 18 19 will be in neutral positions similar to the position shown in Fig. 2 and will effect no contact, whereas the armatures of the distributers 27 28 29 30 will make contact with their respective contact-stops 36 36 and the distributers 27 28 will place the sets 3 4 in direct communication with each other through the transmission-line 15 and the armatures 32 32, while the distributers 29 30 will simultaneously close the bridge-circuits 56 56 by means of their armatures 32 32 and stops 36 36. Consequently the sets 3 4 will now be alone in communication with the line and will form a quadruplex system adapted to be operated in the ordinary manner. During the passage of a negative impulse it will readily be seen that the sets 1 2 will be placed in direct communication with the line 15 through the stops 25 and the armatures of the distributers 16 17, while the sets 3 4 5 6 will be entirely disconnected therefrom, and that during the connection of said sets 1 2 with the line their bridge-wires 54 54 will be completed by the insulated contact-pieces 55 on the armatures of the distributers 18 19 making contact with the stops 25 25 of said distributers. Consequently the sets 1 2 can be operated in the ordinary manner as a complete quadruplex system. The reason on account of which the bridge-wires of the various quadruplex sets are opened or interrupted during the intervals of time during which the corresponding sets are disconnected from the transmission-line is that if the bridge-wires were not so interrupted the home receiving instruments would be operated on the depression of the home keys on the disconnection of the quadruplex set from the transmission-line, as the balance existing during connection with the transmission-line is destroyed as soon as disconnection occurs. It is to be understood, however, that instead of breaking the bridge-wires the system will operate satisfactorily if the battery-circuits are interrupted in a similar manner. Instead of, however, interrupting the bridge-wires or the battery-circuits extra resistance in these circuits might be introduced to achieve the same result, or the receiving instruments may be short-circuited.

In the transmission of telegraphic impulses, such as dots and dashes, in the manner described, it is of course understood that the dots and dashes are broken into parts and transmitted in sections, the parts forming one telegraphic impulse being transmitted alternately with parts forming other telegraphic impulses of one of the other quadruplex systems.

It is of course understood that the distributers at the two ends of the line are operated synchronously by the synchronizing-current generated by the magneto-generator or other equivalent source.

In order to improve the synchronizing of the various distributers, the generator of the synchronizing-current may be connected midway between the two stations at the two ends of the line in order that the effect of leakage on the current operating the distributers may be equalized.

It is of course necessary to oscillate the armatures of the distributers at such a rate that the reading of the messages is not interfered with by the intermittent manner in which the quadruplex sets forming one complete system are connected with each other through the line.

In order to minimize sparking occurring at the contacts of the distributers, the distributers may be inclosed in an air-tight case 58 containing gases under a pressure greater than that of normal atmospheric pressure. Fig. 5 shows two distributers 59 60 mounted upon frame 61, inclosed in said air-tight case. The case 58, which may conveniently be of glass, is shown mounted upon the base-plate 62, through which the supply-pipe 63 is adapted to lead the gases under pressure.

Fig. 6 shows diagrammatically the apparatus at one end of a line operated, according to the present invention, on a triple differential quadruplex system, the two ends of the line being practically identical. The manner of operation of the whole system will be readily understood by reference to this figure, showing the apparatus at one end of the line. In this figure, 64 65 66 are three differential quadruplex sets, each of which when connected through the line with one of three corresponding sets at the other end of the line is adapted to be operated as a differential quadruplex system in the ordinary manner. The distributers are arranged with reference to these three sets in a similar manner to the way in which the distributers 16, 27, 29, and 18 are arranged with reference to the quadruplex sets 1 3 5, as shown in Fig. 1 and in Fig. 6. The same parts in connection with the distributers are designated by the same reference-numerals as those which designate similar parts in Fig. 1. The same apparatus is conveniently used in the sets 64 65 66. 67 in each set is the increment-key of a local circuit 68, adapted to operate, by means of an electromagnet 69, the increment-transmitter 70. 71 is the reversing-key, arranged in the local circuit 72 and adapted on being depressed to operate, by means of the electromagnet 73, the reversing-transmitter 74, which may be of any convenient type. 75 is the battery; 76, a receiving instrument of the ordinary type, having a polarized armature 77 and a non-polarized armature 78. The polarized armature 77 is adapted when operated to close the local circuit in which the sounder 79 is arranged. The non-polarized armature 78 when operated is adapted to open the local circuit containing the electromagnet 80, which when demagnetized drops its coacting armature and closes the local circuit containing the sounder 81. 82 is the artificial line. 83 is an adjustable resistance, and 84 is an adjustable condenser for obtaining balance. 85 86 are choking or inductance coils for balancing the self-induction of the line and instruments connected therewith. It is to be understood that each of the differential quadruplex sets 64 65 66 and the corresponding sets at the other end of the line may be of any ordinary or suitable type. The manner in which the system according to Fig. 6 is operated is similar to the manner of operation of the system shown in Fig. 1. The three sets at one end of the line are successively connected one at a time to the transmission-line, synchronous connections of the corresponding sets at the other end of the line being effected by means of the distributers above described, and during the interval of time during which any one set is disconnected from the line the circuit of the artificial line is also broken in order that the home receiving instruments may not be operated by the home transmitters during the disconnection of the set from the transmission-line. It is to be understood, however, that instead of breaking the artificial line the battery-circuit may be broken, or, on the other hand, the receiving instrument or instruments may be short-circuited during the disconnection of the set from the line. In fact, any convenient means may be employed for rendering the receiving instruments inoperative during the time of disconnection of the set from the line.

It is of course to be understood that the present invention may be applied to a system in which three duplex systems of either the bridge or the differential type are arranged at the two ends of the signal-transmission line. The method of operation of such a triple duplex system is in principle similar to the method of operation of the triple quadruplex systems above described, the actual connections, however, being considerably simpler.

Fig. 7 illustrates a system by which the six differential quadruplex sets 87 88 89 90 91 92, which are placed at widely-separated stations, can simultaneously communicate with each other in pairs by means of the signal-transmission line 93 93. The set 87 communicates with 92, 88 with 91, 89 with 90. 94 94 represent the synchronizing-circuit, containing the distributers 95 96 97 98 99 100. 101 101 are the six quadruplex receiving instruments, each having a polarized and a non-polarized armature, and 102 102 is the artificial line of each set. Each of the armatures of the distributers 95 96 97 98 99 100 carries an insulated contact-piece, $95^a$ $96^a$ $97^a$ $98^a$ $99^a$ $100^a$, respectively, at one end, which is adapted when in contact with its corresponding stationary contact to short-circuit one side of the receiving instrument 101. Each of the armatures of the distributers 95 96 99 100 is permanently connected with the transmission-line 93, and the armature is adapted to make contact with a contact-stop which is connected with the receiving instrument. Each of the armatures of the distributers 97 98 is connected permanently with the corresponding receiving instrument 101 and is adapted when operated to make contact with a contact-stop permanently in connection with the transmission-line 93. The method of operation is as follows: Supposing a positive current impulse to flow along the synchronizing-line, the armatures of the various distributers will be in the positions indicated in Fig. 7, the set 87 being connected through the armatures of the distributers 95 and 100, the line 93 between the latter with the set 92 and forming a complete differential quadruplex system therewith, the sets 88 89 90 91 being disconnected from the transmission-line during the passage of the positive current impulse and one side of the receiving instruments 101 of said four sets being short-circuited in the manner hereinbefore described. During the period of zero current in the synchronizing-line the sets 89 and 90 will be directly connected together through the transmission-line 93 and the armatures of the distributers 97 98, the sets 87 88 91 92 being disconnected therefrom and one side of their receiving instruments being short-circuited. During the passage of the negative current impulse the set 88 will be connected, through the line 93 and the armatures of the distributers 96 and 99, with the set 91, the remaining sets being disconnected from the line and one side of their receiving instruments being short-circuited. In Fig. 7 the complete set of instruments for each quadruplex set is not shown, as any suitable quadruplex system may be employed, such as those shown in Fig. 6.

Fig. 8 illustrates one end of a system in which the synchronizing-line of a triple differential quadruplex system such as that illustrated by Fig. 6 is also utilized as a signaling-line by adding increments of current to the synchronizing-current impulses of the synchronizing-circuit. The upper portion of the diagram shown in Fig. 8 illustrates one end of a triple quadruplex differential system such as that illustrated in Fig. 6, only so much of the system being shown as is sufficient to make the connections of the whole system readily comprehensible. Instead of grounding the synchronizing-line at 38, as in Fig. 6, the synchronizing-line 103, Fig. 8, is connected in series with a two-way polarized distributer 104 and with the differential instrument 105. The central portion of the differentially-wound receiving instrument 105 is connected with the pivoted armature of the distributer 104, which is adapted, according to the direction of current in the distributer, to make contact with one or other of the contacts 107 108, connected through the direct-current generators 109 110, respectively, to earth through the keys 111 112, which are normally open. The differential receiving instrument is provided with two polarized armatures 113 114, which when operated close the local circuits of the sounders 115 116. It is to be understood that the synchronizing-line 103 is connected at each end to a set of instruments similar to that shown at the end of the synchronizing-line shown in Fig. 8. If it is desired to send a telegraphic message through the synchronizing-circuit from the end of the synchronizing-line shown in Fig. 8, either the key 111 or the key 112 may be employed for the transmission of the signal impulses. Supposing the key 112 be employed, it is evident that when the armature of the distributer is in contact with the contact-block 108, as shown in Fig. 8, an increment of current will pass from the direct-current generator 110 through the block 108 and the armature of the distributer 104 to the line at the instrument 105, and said increment-current will not affect the differentially-wound home instrument 105, but will affect the corresponding receiving instrument at the other end, as is well understood in differential duplex telegraphy. It should be mentioned that the receiving instruments 105 at each end of the line are so set that their armatures cannot be operated by the normal synchronizing-current. A message can be equally well sent by employing the key 111 instead of the key 112, in which case the signal is sent by adding increments to the negative current impulses in the synchronizing-line, said increments being generated by the generator 109 during the contact of the armature of the distributer 104 with the contact-block 107, and passing through said block to the line at the instrument 105. If two messages are to be simultaneously sent from the end of the line shown in Fig. 8, the keys 111 112 are operated simultaneously, in which case the positive-current increments operate one of the armatures of the distant receiving instrument and the negative-current increments operate the other armature of the distant receiving instrument, the home receiving instrument being unaffected by either set of impulses. Simultaneously with the transmission of one or two messages from the end of the line shown in Fig. 8 to the other end messages may be sent from the distant end to the receiving instrument 105, (shown in Fig. 8,) the armature 113 answering to, say, the positive-current increments and the armature 114 to the negative-current increments. The nature of the impulses of the synchronizing-circuit during the increment of both the positive and the negative synchronizing impulses is illustrated graphically by Fig. 10, the ordinates of the full lines indicating the strength of the current in the synchronizing-circuit during the passage of these messages, and the ordinates of the dotted lines show the normal synchronizing-current impulses, the difference between the ordinates of the dotted and full lines giving the strength of the current-increments employed in signaling along the synchronizing-circuit.

Fig. 11 illustrates means for repeating the synchronizing-current impulses from the circuit 117 117 onto the synchronizing-circuit 118 118. There is no need to provide means for repeating backward from the circuit 118 to the circuit 117. Fig. 11 also shows means whereby the signaling-increments of the synchronizing impulses in the circuit 117 can be repeated onto the circuit 118, and also means whereby such increments can be repeated from the circuit 118 onto the circuit 117. The lower portion of the diagram in Fig. 11 illustrates means for repeating the signaling-currents in the transmission-line 119 onto the transmission-line 320, and also means for repeating the signaling-currents from the transmission-line 320 in the opposite direction onto the transmission-line 119. In order to repeat the synchronizing-current impulses from the synchronizing-circuit 117 onto the synchronizing-circuit 118, the synchronizing-line after being connected with the distributers which are provided for the repeating of the signaling-currents is connected in series with the two-way polarized distributers 120 121 and with the differentially-wound relay 122 and through the artificial line 123 and means for adjusting the same to earth 124. The differential instrument 122 is set too high for the synchronizing-current impulses to affect it. The oscillatory armature of the distributer 120 is connected with the connecting-wire 125 and is adapted to make contact with the two contact-stops in connection with the direct-current generators 126 127, respectively, said generators being both connected with the synchronizing-line 118. The connecting-wire 125 is connected in series with the distributer 128 and with the differentially-wound relay 129 and the artificial line and means for adjusting the same, 130, earthed at 131. When a positive synchronizing impulse flows through the circuit 117, the armature of the distributer 120 makes contact with the contact-stop connected with the current-generator 127, which thereby is connected in the synchronizing-circuit 118 and sends a positive synchronizing impulse along said circuit, the strength of said impulse being insufficient to affect the differential instrument 129. Similarly when a negative impulse passes along the synchronizing-circuit 117 the generator 126 is directly connected in the synchronizing-circuit 118, and said generator is so connected that a negative current impulse passes along said circuit 118. During a zero period in the circuit 117 the armature of the distributer 120 does not connect either of the generators 126 127 in the circuit 118, and consequently for every zero period in the circuit 117 there is a corresponding zero period in the circuit 118, and, as above described, positive and negative impulses in the circuit 117 produce, by means of the generators 127 126, corresponding positive and negative impulses in the circuit 118. Referring now to the repeating of the signaling-increments of the synchronizing impulses in the circuit 117 onto the circuit 118, the differential instrument 122 is provided with two polarized armatures 132 133, arranged when operated to complete the electromagnets 134 135 in corresponding local circuits. The electromagnet 134 is adapted to control the local circuit 136, in which the electromagnet 137 is arranged. This electromagnet 137 when energized by means of its armature connects the generator 138 with the contact-stop 139 of the distributer 128. The armature of the electromagnet 135 is arranged to control the local circuit 140, containing the electromagnet 141, the armature of which when attracted is adapted to connect the direct-current generator 142 with the contact-stop 140 of the distributer 128. The armature of the distributer 128 is connected with the central point of the winding of the differential instrument 129. When a positive-increment signal passes in the synchronizing-circuit 117, the differential instrument 122 is affected, and the armature 133 is attracted to the electromagnet of the instrument, and the electromagnet 135 is energized, whereupon the local circuit 140 is closed, the electromagnet 141 is energized, and the generator 142 is connected with the stop 140. During the passage of this positive increment the armature of the distributer 126 will complete the circuit of the synchronizing-line 118 through the generator 127, and the distributer 128 will, on account of the positive impulse generated by the generator 127, connect the central point of the differential instrument 129 with the stop 140, and consequently the generator 142 will add a positive increment to the current impulse provided by the generator 127—that is to say, the positive-increment signal in the circuit 117 will be repeated onto the circuit 118. When the negative signaling-increment passes in the circuit 117, the armature of the distributer 120 will make contact with the contact-stop connected with the generator 126 and the armature of the distributer 128 will make contact with the contact-stop 139. The armature 132 of the differential instrument 122 will complete its local circuit, causing the electromagnet 134 to close the local circuit 136 and energize the electromagnet 137, which will connect the generator 138 with the stop 139. Consequently to the negative impulse generated by the generator 126 there will be added a negative increment generated by the generator 138. For each zero period in the circuit 117 there will be a corresponding zero period in the circuit 118, and consequently the means described are evidently adapted to repeat the positive increments, zero period and negative increments following each other consecutively in the circuit 117 onto the circuit 118.

In order to repeat positive and negative signaling-increments from the synchronizing-circuit 118 onto the synchronizing-circuit 117, apparatus similar to that just described is arranged. Referring to Fig. 11, it will be seen that the armatures 143 144 correspond with the armatures 133 132, respectively, the electromagnets 145 146 with the electromagnets 135 134, respectively, local circuits 147 148 with the local circuits 140 136, respectively, electromagnets 150 149 with the electromagnets 141 137, respectively, the generators 152 151 with the generators 142 138, respectively, and the contact-stops 154 153 with the contact-stops 140 139, respectively. The manner in which the signaling-increments are repeated from the circuit 118 onto the circuit 117 is similar to the manner in which they are repeated from the circuit 117 onto the circuit 118 and will be readily understood from the description relating to the latter case.

Referring now to the repeating of the signaling-currents from the transmission-line 119 onto the transmission-line 320, the lower portion of Fig. 11 shows means for repeating the signaling-currents of one of the quadruplex sets of the complete triple quadruplex system, the apparatus required for the repetition of the signals of the remaining two quadruplex sets of signals being a repetition of the apparatus shown. The relation of the distributers 155 156 157 158 159 160 161 162 to the means for repeating the signals of the three quadruplex sets will be readily understood from the connections shown in Fig. 4. The distributers 155 156 157 158 are inserted in series in the synchronizing-circuit 117, the distributers 159 160 161 162 being connected in series in the synchronizing-circuit 118. The repeating means shown in Fig. 11 may be taken to illustrate the means for repeating the quadruplex messages transmitted during the passage of the positive synchronizing impulses in the synchronizing-circuit 117. Considering first the repetition of the signaling-currents from the transmission-line 119 onto the transmission-line 220, during the passage of the positive synchronizing impulses the armature of the distributer 155 will make contact with the stop 163, while the armature of the distributer 158 will make contact with the stop 164. The armature of the distributer 155 is thus during the passage of a positive impulse connected through the stop 163 with the quadruplex instrument 165, provided with the polarized armature 166 and the non-polarized armature 167, while the circuit 168 of the artificial line and means for balancing the same, 169, will be completed by the armature of the distributer 158 contacting with the stop 164. If the non-polarized armature 167 be attracted by the signaling-current, the electromagnet 170 will close the local circuit of the electromagnet 171, which will operate the increment-transmitter 172, which will send an increment of current along the transmission-line 320, the armature of the distributer 159 making contact with the contact-stop 173 and the armature of the distributer 163 making contact with the contact-stop 181, this increment of current sent along the transmission-line 320 being a repetition of the increment of current received by the receiving instrument 165 and causing operation of the non-polarized armature 167. If the polarized armature of the receiving instrument 165 be operated by the signaling-current which passes through said receiving instrument, the local circuit of the electromagnet 174 will be completed, whereupon said electromagnet will close the local circuit in which the electromagnet 175 is connected and said electromagnet on being energized will operate the reversing-transmitter 176 and will reverse the current sent by the battery 177 through the line 320. In this manner the signaling-currents received by the instrument 165 will be repeated by the transmitters 172 176 onto the transmission-line 320. The manner in which the signaling-currents are repeated from the transmission-line 320 onto the transmission-line 119 is similar to the method of operation just described, the receiving instrument 178 corresponding with the receiving instrument 165, the armatures 179 180 with the armatures 166 167, the circuit 182 with the circuit 168, the artificial line and means for adjusting the same, 183, with 169, the electromagnets 184 185 with the electromagnets 170 171, the increment-transmitter 186 with the increment-transmitter 172, the electromagnets 187 188 with the electromagnets 174 175, the reversing-transmitter 189 with the reversing-transmitter 176, and the battery 190 with the battery 177.

In Fig. 11, 191 191 are sounders, which can be employed to receive the messages at the repeating-station, and 192 192 are keys or switches which are closed when it is merely desired to receive the messages at the repeating-station and not to repeat them.

Instead of employing two separate distributers, such as 155 156 or 157 and 158, as indicated in Fig. 11, one distributer of each pair having a polarized oscillatory armature and the other a non-polarized armature, I prefer to combine the two distributers in a single three-way distributer having a polarized armature and a non-polarized armature, as shown in Figs. 12 to 14, the electrical connections of said three-way distributer being indicated diagrammatically by Fig. 15. Referring to these figures, 193 is the synchronizing-line which energizes the electromagnet 194. 195 is a polarized oscillatory armature adapted to make contact with the adjustable contact-stops 196 197. 198 is a non-polarized armature pivoted at 199 and adapted when no current flows from the electromagnet to rise against and make contact with the contact-stop 200. The polarized armature 195, which is pivoted on the pivot 201, is mounted on the base 202, having a projection 203 engaging with a recess 204 in the piece 205, mounted on the base of the distributer. An adjusting-screw 206 engages with the base 202, and by turning the milled head 207 the position of the base 205 can be adjusted, the polarized armature thereby being brought nearer to or placed farther from the polepieces 208 209 of the electromagnet, whereby the strength of the field in which the armature works can be adjusted. The contacts 196, 197, and 200 can also be individually adjusted and locked in position by the lock-nuts 210. The non-polarized armature can be adjusted by adjusting the tension-spring 211, attached to the tailpiece 212 of the armature. The armatures of this three-way distributer are thus adapted to form three separate and distinct contacts in a consecutive manner when an alternate current actuates the distributer.

Fig. 16 shows means for generating the synchronizing impulses from two direct-current generators and means for repeating the synchronizing impulses. 245 is a magneto-generator of any suitable form and is adapted to rock the polarized armature of the electromagnet 246. Said armature, which is connected with the line 247 247, is adapted to make contact with contact-stops connected with the two direct-current generators 248 249, one of which is adapted to send a positive impulse along the line and the other a negative impulse. The distributer 250 is inserted at one end of the line 247 and another distributer 251 at the other end of said line, the line 247 being earthed at 252. The distributer 251 is provided with an oscillatory armature, which is adapted to make contact with two contacts connected with the two generators 253 254, and said armature is connected with the wire 255, connected with the distributer 256. On the armature of the distributer 251 being oscillated alternate positive and negative impulses are generated by the generators 253 254, and said impulses pass through the armature to the line 255 and operate the distributer 256, which is provided with an oscillatory armature. The armatures of the distributers 250 256 are connected together by means of the line 257, and as the distributers 250 256 are operated synchronously said line 257 is connected alternately through said armatures and their stops between the leads 258 259 and between the leads 260 261.

What I claim is—

1. In a multiplex telegraphic system, the combination of a plurality of sets of telegraphic instruments, each set such as to be capable of communicating through one conductor with a similar set of instruments, means for supplying continuous electric current to said sets of instruments, conveying means for the signals of said instruments, a rocking armature between each of the sets of instruments aforesaid and said conveying means adapted to electrically connect and disconnect the set to and from the conveying means, a separate source of electric current, and a plurality of electromagnets controlled by the current from said source adapted to operate in pairs at rapidly-succeeding intervals of time the connecting and disconnecting armatures aforesaid between the sets of instruments and the signal-conveying means.

2. In a multiplex telegraphic system, the combination of a plurality of sets of telegraphic instruments each set such as to be capable of communicating through one conductor with a similar set of instruments, means for supplying continuous electric current to said sets of instruments conveying means for the signals of said instruments, a source of electric energy giving a current composed of rapidly-succeeding impulses, separate conducting means for conveying said current, and means under the control of said current consisting of an electromagnet with rocking armature in connection with each set of instruments, adapted to connect and disconnect said sets of instruments in pairs in rapid succession to and from the signal-conveying means.

3. In a multiplex telegraphic system, the combination of a plurality of sets of telegraphic instruments each set such as to be capable of communicating through one conductor with a similar set of instruments, means for supplying continuous electric current to said sets of instruments, conveying means for the signals of said instruments, a rocking armature between each of the sets of instruments aforesaid and the conveying means adapted to electrically connect and disconnect the sets to and from the conveying means and to simultaneously render operative and inoperative respectively the receiving instruments of said sets, a separate source of electric current, and a plurality of electromagnets controlled by said current adapted to operate in pairs at rapidly-succeeding intervals of time the connecting and disconnecting armatures aforesaid between the sets of instruments and the signal-conveying means.

4. In a multiplex telegraphic system, the combination of a plurality of sets of telegraphic instruments each set such as to be capable of communicating through one conductor with a similar set of instruments, means for supplying continuous electric current to said sets of instruments, conveying means for the signals of said instruments, a source of electric energy giving a current composed of rapidly-succeeding impulses, separate conducting means for conveying said current, and means under the control of said current consisting of an electromagnet with rocking armature in connection with each set of instruments adapted to connect and disconnect said sets of instruments in pairs in rapid succession to and from the signal-conveying means and to simultaneously render operative and inoperative respectively the receiving instruments of said pairs of sets.

5. In a multiplex telegraphic system, the combination of six sets of telegraphic instruments each set such as to be capable of communicating through one conductor with a similar set of instruments, means for supplying continuous electric current to said sets of instruments, conveying means for the signals of said instruments, a source of electrical energy adapted to give an alternating current in which each alternation is separated from the next by an interval of approximately zero current, conducting means for conveying the current from said source, and six contact making and breaking devices under the control of the alternating current from said source, two of which devices are adapted to connect two of the sets of instruments to the signal-conveying means during the period of positive impulse only, two others to connect two other sets of instruments to the signal-conveying means during the period of negative impulse only, while the remaining two are adapted to connect the remaining two sets of instruments to the signal-conveying means only during the period of zero current in the alternating circuit.

6. In a multiplex telegraphic system, the combination of six sets of telegraphic instruments each set such as to be capable of communicating through one conductor with a similar set of instruments, means for supplying continuous electric current to said sets of instruments, conveying means for the signals of said instruments, a source of electrical energy adapted to give an alternating current in which each alternation is separated from the next by an interval of approximately zero current, conducting means for conveying the current from said source, and six contact making and breaking devices under the control of the alternating current from said source, said devices being adapted to operate in pairs to connect each one set of instruments to the signal-conveying means during the periods of positive, zero and negative current impulses respectively, and to render inoperative the receiving instruments of the sets during the periods in which they are disconnected from said signal-conveying means.

7. In a multiplex telegraphic system, the combination with a plurality of sets of telegraphic instruments each set such as to be capable of communicating through one conductor with a similar set of instruments, means for supplying continuous electric current to said sets of instruments, conveying means for the signals of said instruments, a source of alternating electric current, conducting means for conveying said current, and means under the control of said alternating current adapted to connect and disconnect said sets of instruments in pairs in rapid succession to and from the signal-conveying means first mentioned, of a set of telegraphic instruments at each end of the conducting means which carries the alternating current, the receivers of which sets of instruments are set too high to be affected by said alternating current, and means in connection with said sets of instruments last mentioned for adding increments to the alternations of the alternating current, substantially as and for the purpose set forth.

8. In a multiplex telegraphic system, the combination with a plurality of sets of telegraphic instruments each set such as to be capable of communicating through one conductor with a similar set of instruments, means for supplying continuous electric current to said sets of instruments, conveying means for the signals of said instruments, a source of alternating electric current, conducting means for conveying said current and means under the control of said alternating current adapted to connect and disconnect said sets of instruments in pairs in rapid succession to and from the signal-conveying means, and to simultaneously render operative and inoperative respectively the receiving instruments of said pairs of sets, of a set of telegraphic instruments at each end of the conducting means which carries the alternating current, the receivers of which sets of instruments are set too high to be affected by said alternating current, and means in connection with said sets of instruments last mentioned for adding increments to the alternations of the alternating current, substantially as and for the purpose set forth.

9. In a multiplex telegraphic system, the combination of a plurality of sets of telegraphic instruments each set such as to be capable of communicating through one conductor with a similar set of instruments, means for supplying continuous electric current to said sets of instruments, conveying means for the signals of said instruments, a source of electric energy giving a current composed of rapidly-succeeding impulses, an insulated conductor for conveying said current, a further insulated conductor, a further source of electric energy, a device adapted to connect said further source to the further insulated conductor, said device being such and arranged in such manner as to be operated by the impulses passing in the first conductor, and a plurality of devices consisting of electromagnets with rocking armatures adapted to be controlled by the impulses in said conductors and to connect and disconnect the sets of telegraphic instruments in pairs in rapid succession to and from the signal-conveying means.

10. In a multiplex telegraphic system, the combination of a plurality of sets of telegraphic instruments each set such as to be capable of communicating through one conductor with a similar set of instruments, means for supplying continuous electric current to said sets of instruments, two line-wires each connected to one-half of the sets of instruments, means for repeating electrical impulses from one wire to another in similar direction and proportionate strength, a separate source of alternating electric current, means for conveying the current from said source, and a plurality of devices consisting of electromagnets and rocking armatures controlled by said current adapted to operate in pairs at rapidly-succeeding intervals of time to connect and disconnect the sets of instruments to and from their line-wires.

11. In a multiplex telegraphic system, the combination of a plurality of sets of telegraphic instruments each set such as to be capable of communicating through one conductor with a similar set of instruments, means for supplying continuous electric current to said sets of instruments, two line-wires each connected to one-half of the sets of instruments, means for repeating impulses from one wire to another in similar direction and proportionate strength, a separate source of alternating electric current, means for conveying the current from said source, and a plurality of devices consisting of electromagnets and rocking armatures controlled by said current adapted to operate in pairs at rapidly-succeeding intervals of time to connect and disconnect the sets of instruments to and from their line-wires, and to simultaneously render operative and inoperative respectively the receiving instruments of said pairs of sets.

12. In a multiplex telegraphic system, the combination of a plurality of sets of telegraphic instruments each set such as to be capable of communicating through one conductor with a similar set of instruments, means for supplying continuous electric current to said sets of instruments, two line-wires each connected to one-half of the sets of instruments, means for repeating electrical impulses from one wire to another in similar direction and proportionate strength, a separate source of alternating electric current, a conductor for the current from said source means for repeating the electrical impulses passing in said conductor, a further conductor for said repeated impulses, and a plurality of devices half of which are adapted to be controlled by the impulses in one conductor and half by the impulses in the other conductor, said devices consisting of electromagnets with rocking armatures adapted to connect and disconnect the sets of instruments in pairs to and from their line-wires.

13. In a multiplex telegraphic system, the combination of a plurality of sets of telegraphic instruments each set such as to be capable of communicating through one conductor with a similar set of instruments, means for supplying continuous electric current to said sets of instruments, conveying means for the signals of said instruments, a rocking armature between each of the sets of instruments aforesaid and said conveying means adapted to electrically connect and disconnect the set to and from the conveying means, two separate sources of continuous electric current of opposite sign, a conductor, means adapted to alternately and at rapidly-succeeding intervals connect said sources to said conductor, and a plurality of electromagnets controlled by the impulses in said conductor, adapted to operate the connecting and disconnecting means aforesaid, in such manner that the sets of instruments are put in connection in pairs through the signal-conveying means at rapidly-succeeding intervals.

14. In a multiplex telegraphic system, the combination of a plurality of sets of telegraphic instruments each set such as to be capable of communicating through one conductor with a similar set of instruments, means for supplying continuous electric current to said sets of instruments, conveying means for the signals of said instruments, a rocking armature between each set of the sets of instruments aforesaid and said conveying means adapted to electrically connect and disconnect the set to and from the conveying means, two separate sources of continuous electric current of opposite sign, a conducting-wire, means adapted to alternately and at rapidly-succeeding intervals connect said sources to the conducting-wire, a second conducting-wire, means for repeating the electrical impulses produced in said first conducting-wire in the second conducting-wire, and a plurality of electromagnets controlled by the impulses in said two conducting-wires adapted to operate in pairs at rapidly-succeeding intervals of time the connecting and disconnecting means aforesaid, whereby the sets of instruments are put in connection in pairs through the signal-conveying means at rapidly-succeeding intervals.

15. In a multiplex telegraphic system, the combination of a plurality of sets of telegraphic instruments each set such as to be capable of communicating through one conductor with a similar set of instruments, means for supplying continuous electric current to said sets of instruments, two line-wires each connected to one-half of the sets of instruments, means for repeating electrical impulses from one wire to another in similar direction and proportionate strength, two separate sources of continuous electric current of opposite sign, conducting means for the current from said sources, a plurality of rocking armatures adapted to alternately and at rapidly-succeeding intervals of time connect said sources to the conducting means, and a plurality of electromagnets under the control of the impulses in said conducting means adapted to connect and disconnect the sets of instruments in pairs to and from the line-wires at rapidly-succeeding intervals of time.

In testimony whereof I have signed my name to this specification in the presence of two subscribing witnesses.

GEORGE LEWIS HOGAN.

Witnesses:
ERNEST F. FOTHERGILL,
CLEMENT LEAN.